(12) United States Patent
Starr et al.

(10) Patent No.: US 8,539,513 B1
(45) Date of Patent: Sep. 17, 2013

(54) ACCELERATING DATA TRANSFER IN A VIRTUAL COMPUTER SYSTEM WITH TIGHTLY COUPLED TCP CONNECTIONS

(75) Inventors: Daryl D. Starr, Milpitas, CA (US); Peter K. Craft, San Francisco, CA (US); Clive M. Philbrick, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 1031 days.

(21) Appl. No.: 12/410,366

(22) Filed: Mar. 24, 2009

Related U.S. Application Data (60) Provisional application No. 61/072,773, filed on Apr. 1, 2008.

(51) Int. Cl.
G06F 9/44 (2006.01)
G06F 15/16 (2006.01)

(52) U.S. Cl.
USPC .......................................... 719/319; 709/227

(58) Field of Classification Search
USPC .......................................................... 719/319
See application file for complete search history.

(56) References Cited

U.S. PATENT DOCUMENTS

| | | | |
|---|---|---|---|
| 4,366,538 A | 12/1982 | Johnson et al. | |
| 4,485,455 A | 11/1984 | Boone et al. | |
| 4,485,460 A | 11/1984 | Stambaugh | |
| 4,589,063 A | 5/1986 | Shah et al. | |
| 4,700,185 A | 10/1987 | Balph et al. | |
| 4,991,133 A | 2/1991 | Davis et al. | |
| 5,056,058 A | 10/1991 | Hirata et al. | |
| 5,058,110 A | 10/1991 | Beach et al. | |
| 5,097,442 A | 3/1992 | Ward et al. | |
| 5,129,093 A | 7/1992 | Muramatsu et al. | |
| 5,163,131 A | 11/1992 | Row et al. | |
| 5,212,778 A | 5/1993 | Dally et al. | |
| 5,274,768 A | 12/1993 | Traw et al. | |
| 5,280,477 A | 1/1994 | Trapp | |
| 5,281,963 A | 1/1994 | Ishikawa et al. | |
| 5,289,580 A | 2/1994 | Latif et al. | |
| 5,303,344 A | 4/1994 | Yokoyama et al. | |
| 5,412,782 A | 5/1995 | Hausman et al. | |
| 5,418,912 A | 5/1995 | Christenson | |

(Continued)

FOREIGN PATENT DOCUMENTS

| | | |
|---|---|---|
| WO | WO 98/19412 | 5/1998 |
| WO | WO 98/50852 | 11/1998 |

(Continued)

OTHER PUBLICATIONS

"Hardware Assisted Protocol Processing", (which Eugene Feinber is working on). Downloaded from the internet and printed on Nov. 25, 1998. 1 page.

(Continued)

*Primary Examiner* — H S Sough
*Assistant Examiner* — Abdou Seye
(74) *Attorney, Agent, or Firm* — Mark Lauer; Silicon Edge Law Group LLP (57) ABSTRACT

First and second operating systems of a virtual computer system can communicate using respective first and second network protocol stacks, by employing procedures that are specialized for a situation in which a TCP control block of the first stack and a TCP control block of the second stack correspond to the same logical connection. In this case, various TCP requirements can be bypassed by coupling the TCP control blocks, reducing or eliminating data copies and providing other efficiencies.

38 Claims, 3 Drawing Sheets

(56) References Cited

U.S. PATENT DOCUMENTS

| | | |
|---|---|---|
| 5,448,566 A | 9/1995 | Richter et al. |
| 5,485,455 A | 1/1996 | Dobbins et al. |
| 5,485,460 A | 1/1996 | Schrier et al. |
| 5,485,579 A | 1/1996 | Hitz et al. |
| 5,506,966 A | 4/1996 | Ban |
| 5,511,169 A | 4/1996 | Suda |
| 5,517,668 A | 5/1996 | Szwerinski et al. |
| 5,524,250 A | 6/1996 | Chesson et al. |
| 5,535,375 A | 7/1996 | Eshel et al. |
| 5,548,730 A | 8/1996 | Young et al. |
| 5,553,241 A | 9/1996 | Shirakihara |
| 5,566,170 A | 10/1996 | Bakke et al. |
| 5,574,919 A | 11/1996 | Netravali et al. |
| 5,588,121 A | 12/1996 | Reddin et al. |
| 5,590,328 A | 12/1996 | Seno et al. |
| 5,592,622 A | 1/1997 | Isfeld et al. |
| 5,596,574 A | 1/1997 | Perlman et al. |
| 5,598,410 A | 1/1997 | Stone |
| 5,619,650 A | 4/1997 | Bach et al. |
| 5,629,933 A | 5/1997 | Delp et al. |
| 5,633,780 A | 5/1997 | Cronin |
| 5,634,099 A | 5/1997 | Andrews et al. |
| 5,634,127 A | 5/1997 | Cloud et al. |
| 5,642,482 A | 6/1997 | Pardillos |
| 5,664,114 A | 9/1997 | Krech, Jr. et al. |
| 5,671,355 A | 9/1997 | Collins |
| 5,678,060 A | 10/1997 | Yokoyama et al. |
| 5,682,534 A | 10/1997 | Kapoor et al. |
| 5,684,954 A | 11/1997 | Kaiserwerth et al. |
| 5,692,130 A | 11/1997 | Shobu et al. |
| 5,699,317 A | 12/1997 | Sartore et al. |
| 5,699,350 A | 12/1997 | Kraslavsky |
| 5,701,434 A | 12/1997 | Nakagawa |
| 5,701,516 A | 12/1997 | Cheng et al. |
| 5,727,142 A | 3/1998 | Chen |
| 5,742,765 A | 4/1998 | Wong et al. |
| 5,749,095 A | 5/1998 | Hagersten |
| 5,751,715 A | 5/1998 | Chan et al. |
| 5,751,723 A | 5/1998 | Vanden Heuvel et al. |
| 5,752,078 A | 5/1998 | Delp et al. |
| 5,758,084 A | 5/1998 | Silverstein et al. |
| 5,758,089 A | 5/1998 | Gentry et al. |
| 5,758,186 A | 5/1998 | Hamilton et al. |
| 5,758,194 A | 5/1998 | Kuzman |
| 5,768,618 A | 6/1998 | Erickson et al. |
| 5,771,349 A | 6/1998 | Picazo, Jr. et al. |
| 5,774,660 A | 6/1998 | Brendel et al. |
| 5,778,013 A | 7/1998 | Jedwab |
| 5,778,419 A | 7/1998 | Hansen et al. |
| 5,790,804 A | 8/1998 | Osborne |
| 5,794,061 A | 8/1998 | Hansen et al. |
| 5,802,258 A | 9/1998 | Chen |
| 5,802,580 A | 9/1998 | McAlpine |
| 5,809,328 A | 9/1998 | Nogales et al. |
| 5,809,527 A | 9/1998 | Cooper et al. |
| 5,812,775 A | 9/1998 | Van Seters et al. |
| 5,815,646 A | 9/1998 | Purcell et al. |
| 5,819,111 A | 10/1998 | Davies et al. |
| 5,828,835 A | 10/1998 | Isfeld et al. |
| 5,848,293 A | 12/1998 | Gentry |
| 5,870,394 A | 2/1999 | Oprea |
| 5,872,919 A | 2/1999 | Wakeland |
| 5,878,225 A | 3/1999 | Bilansky et al. |
| 5,878,227 A | 3/1999 | Wade et al. |
| 5,892,903 A | 4/1999 | Klaus |
| 5,898,713 A | 4/1999 | Melzer et al. |
| 5,913,028 A | 6/1999 | Wang et al. |
| 5,917,828 A | 6/1999 | Thompson |
| 5,920,566 A | 7/1999 | Hendel et al. |
| 5,930,830 A | 7/1999 | Mendelson et al. |
| 5,931,918 A | 8/1999 | Row et al. |
| 5,935,205 A | 8/1999 | Murayama et al. |
| 5,935,249 A | 8/1999 | Stern et al. |
| 5,937,169 A | 8/1999 | Connery et al. |
| 5,941,969 A | 8/1999 | Ram et al. |
| 5,941,972 A | 8/1999 | Hoese et al. |
| 5,950,203 A | 9/1999 | Stakuis et al. |
| 5,963,876 A | 10/1999 | Manssen et al. |
| 5,978,844 A | 11/1999 | Tsuchiya et al. |
| 5,987,022 A | 11/1999 | Geiger et al. |
| 5,991,299 A | 11/1999 | Radogna et al. |
| 5,996,013 A | 11/1999 | Delp et al. |
| 5,996,024 A | 11/1999 | Blumenau |
| 6,005,849 A | 12/1999 | Roach et al. |
| 6,009,478 A | 12/1999 | Panner et al. |
| 6,014,380 A | 1/2000 | Hendel et al. |
| 6,014,557 A | 1/2000 | Morton et al. |
| 6,016,513 A | 1/2000 | Lowe |
| 6,021,446 A | 2/2000 | Gentry, Jr. |
| 6,021,507 A | 2/2000 | Chen |
| 6,026,452 A | 2/2000 | Pitts |
| 6,034,963 A | 3/2000 | Minami et al. |
| 6,038,562 A | 3/2000 | Anjur et al. |
| 6,041,058 A | 3/2000 | Flanders et al. |
| 6,041,381 A | 3/2000 | Hoese |
| 6,044,438 A | 3/2000 | Olnowich |
| 6,047,323 A | 4/2000 | Krause |
| 6,047,356 A | 4/2000 | Anderson et al. |
| 6,049,528 A | 4/2000 | Hendel et al. |
| 6,057,863 A | 5/2000 | Olarig |
| 6,061,368 A | 5/2000 | Hitzelberger |
| 6,065,096 A | 5/2000 | Day et al. |
| 6,067,569 A | 5/2000 | Khaki et al. |
| 6,070,200 A | 5/2000 | Gates et al. |
| 6,078,564 A | 6/2000 | Lakshman et al. |
| 6,078,733 A | 6/2000 | Osborne |
| 6,097,734 A | 8/2000 | Gotesman et al. |
| 6,101,555 A | 8/2000 | Goshey et al. |
| 6,111,673 A | 8/2000 | Chang et al. |
| 6,115,615 A | 9/2000 | Ota et al. |
| 6,122,670 A | 9/2000 | Bennett et al. |
| 6,141,701 A | 10/2000 | Whitney |
| 6,141,705 A | 10/2000 | Anand et al. |
| 6,145,017 A | 11/2000 | Ghaffari |
| 6,157,944 A | 12/2000 | Pederson |
| 6,157,955 A | 12/2000 | Narad et al. |
| 6,172,980 B1 | 1/2001 | Flanders et al. |
| 6,173,333 B1 | 1/2001 | Jolitz et al. |
| 6,181,705 B1 | 1/2001 | Branstad et al. |
| 6,202,105 B1 | 3/2001 | Gates et al. |
| 6,219,693 B1 | 4/2001 | Napolitano et al. |
| 6,223,242 B1 | 4/2001 | Sheafor et al. |
| 6,226,680 B1 | 5/2001 | Boucher et al. ............... 709/230 |
| 6,233,242 B1 | 5/2001 | Mayer et al. |
| 6,243,667 B1 | 6/2001 | Kerr et al. |
| 6,246,683 B1 | 6/2001 | Connery et al. |
| 6,247,060 B1 | 6/2001 | Boucher et al. ............... 709/238 |
| 6,279,051 B1 | 8/2001 | Gates et al. |
| 6,289,023 B1 | 9/2001 | Dowling et al. |
| 6,298,403 B1 | 10/2001 | Suri et al. |
| 6,324,649 B1 | 11/2001 | Eyres et al. |
| 6,334,153 B2 | 12/2001 | Boucher et al. ............... 709/230 |
| 6,343,345 B1 | 1/2002 | Hilla et al. |
| 6,343,360 B1 | 1/2002 | Feinleib |
| 6,345,301 B1 | 2/2002 | Burns et al. |
| 6,345,302 B1 | 2/2002 | Bennett et al. |
| 6,356,951 B1 | 3/2002 | Gentry, Jr. |
| 6,370,599 B1 | 4/2002 | Anan et al. |
| 6,385,647 B1 | 5/2002 | Willis et al. |
| 6,389,468 B1 | 5/2002 | Muller et al. |
| 6,389,479 B1 | 5/2002 | Boucher ....................... 709/243 |
| 6,393,487 B2 | 5/2002 | Boucher et al. ............... 709/238 |
| 6,418,169 B1 | 7/2002 | Datari |
| 6,421,742 B1 | 7/2002 | Tillier |
| 6,421,753 B1 | 7/2002 | Hoese et al. |
| 6,427,169 B1 | 7/2002 | Elzur |
| 6,427,171 B1 | 7/2002 | Craft et al. ................... 709/230 |
| 6,427,173 B1 | 7/2002 | Boucher et al. ............... 709/238 |
| 6,434,620 B1 | 8/2002 | Boucher et al. ............... 709/230 |
| 6,434,651 B1 | 8/2002 | Gentry, Jr. |
| 6,449,656 B1 | 9/2002 | Elzur et al. |
| 6,452,915 B1 | 9/2002 | Jorgensen |
| 6,453,360 B1 | 9/2002 | Muller et al. |
| 6,453,406 B1 | 9/2002 | Sarnikowski et al. |

| | | | |
|---|---|---|---|
| 6,470,415 B1 | 10/2002 | Starr et al. | 711/104 |
| 6,473,425 B1 | 10/2002 | Bellaton et al. | |
| 6,480,489 B1 | 11/2002 | Muller et al. | |
| 6,483,804 B1 | 11/2002 | Muller et al. | |
| 6,487,202 B1 | 11/2002 | Klausmeier et al. | |
| 6,487,654 B2 | 11/2002 | Dowling | |
| 6,490,631 B1 | 12/2002 | Teich et al. | |
| 6,502,144 B1 | 12/2002 | Accarie | |
| 6,523,119 B2 | 2/2003 | Pavlin et al. | |
| 6,526,446 B1 | 2/2003 | Yang et al. | |
| 6,542,504 B1 | 4/2003 | Mahler et al. | |
| 6,570,884 B1 | 5/2003 | Connery et al. | |
| 6,591,302 B2 | 7/2003 | Boucher et al. | 709/230 |
| 6,591,310 B1 | 7/2003 | Johnson | |
| 6,594,261 B1 | 7/2003 | Boura et al. | |
| 6,631,484 B1 | 10/2003 | Born | |
| 6,648,611 B2 | 11/2003 | Morse et al. | |
| 6,650,640 B1 | 11/2003 | Muller et al. | |
| 6,657,757 B1 | 12/2003 | Chang et al. | |
| 6,658,480 B2 | 12/2003 | Boucher et al. | 709/239 |
| 6,678,283 B1 | 1/2004 | Teplitsky | |
| 6,681,364 B1 | 1/2004 | Calvignac et al. | |
| 6,683,851 B1 | 1/2004 | Willkie et al. | |
| 6,687,758 B2 | 2/2004 | Craft et al. | 709/250 |
| 6,697,366 B1 | 2/2004 | Kim | |
| 6,697,868 B2 | 2/2004 | Craft et al. | 709/230 |
| 6,751,665 B2 | 6/2004 | Philbrick et al. | 709/224 |
| 6,757,731 B1* | 6/2004 | Barnes et al. | 709/227 |
| 6,757,746 B2 | 6/2004 | Boucher et al. | 709/250 |
| 6,765,901 B1 | 7/2004 | Johnson et al. | |
| 6,807,581 B1 | 10/2004 | Starr et al. | 709/250 |
| 6,842,896 B1 | 1/2005 | Redding et al. | |
| 6,862,264 B1 | 3/2005 | Moura et al. | |
| 6,912,522 B2 | 6/2005 | Edgar | |
| 6,938,092 B2 | 8/2005 | Burns | |
| 6,941,386 B2 | 9/2005 | Craft et al. | 709/250 |
| 6,965,941 B2 | 11/2005 | Boucher et al. | 709/230 |
| 6,976,148 B2 | 12/2005 | Arimilli et al. | 711/207 |
| 6,996,070 B2 | 2/2006 | Starr et al. | 370/252 |
| 7,016,361 B2 | 3/2006 | Swonk et al. | |
| 7,024,460 B2* | 4/2006 | Koopmas et al. | 709/206 |
| 7,042,898 B2 | 5/2006 | Blightman et al. | 370/463 |
| 7,047,320 B2 | 5/2006 | Arimilli et al. | 710/5 |
| 7,073,196 B1 | 7/2006 | Dowd et al. | |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,181,531 B2 | 2/2007 | Pinkerton et al. | |
| 7,185,266 B2 | 2/2007 | Blightman et al. | 714/776 |
| 7,187,679 B2 | 3/2007 | Dally et al. | |
| 7,191,241 B2 | 3/2007 | Boucher et al. | 709/230 |
| 7,191,318 B2 | 3/2007 | Tripathy et al. | |
| 7,237,036 B2 | 6/2007 | Boucher et al. | 709/245 |
| 7,254,696 B2 | 8/2007 | Mittal et al. | |
| 7,260,518 B2 | 8/2007 | Kerr et al. | |
| 7,284,070 B2 | 10/2007 | Boucher et al. | 709/250 |
| 7,287,092 B2 | 10/2007 | Sharp | |
| 7,337,241 B2 | 2/2008 | Boucher et al. | |
| 7,461,160 B2 | 12/2008 | Boucher et al. | |
| 7,472,156 B2 | 12/2008 | Philbrick et al. | |
| 7,496,689 B2 | 2/2009 | Sharp et al. | |
| 7,502,869 B2 | 3/2009 | Boucher et al. | |
| 7,519,699 B2 | 4/2009 | Jain et al. | |
| 7,543,087 B2 | 6/2009 | Philbrick et al. | |
| 7,584,260 B2 | 9/2009 | Craft et al. | |
| 7,620,726 B2 | 11/2009 | Craft et al. | |
| 7,627,001 B2 | 12/2009 | Craft et al. | |
| 7,627,684 B2 | 12/2009 | Boucher et al. | |
| 7,640,364 B2 | 12/2009 | Craft et al. | |
| 7,664,868 B2 | 2/2010 | Boucher et al. | |
| 7,664,883 B2 | 2/2010 | Craft et al. | |
| 7,673,072 B2 | 3/2010 | Boucher et al. | |
| 7,694,024 B2 | 4/2010 | Philbrick et al. | |
| 7,738,500 B1 | 6/2010 | Jones et al. | |
| 8,028,071 B1* | 9/2011 | Mahalingam et al. | 709/227 |
| 2001/0004354 A1 | 6/2001 | Jolitz | |
| 2001/0013059 A1 | 8/2001 | Dawson et al. | |
| 2001/0014892 A1 | 8/2001 | Gaither et al. | |
| 2001/0014954 A1 | 8/2001 | Purcell et al. | |
| 2001/0025315 A1 | 9/2001 | Jolitz | |
| 2001/0037406 A1 | 11/2001 | Philbrick et al. | |
| 2001/0048681 A1 | 12/2001 | Bilic et al. | |
| 2001/0053148 A1 | 12/2001 | Bilic et al. | |
| 2002/0073223 A1 | 6/2002 | Darnell et al. | |
| 2002/0112175 A1 | 8/2002 | Makofka et al. | |
| 2002/0156927 A1 | 10/2002 | Boucher et al. | |
| 2003/0014544 A1 | 1/2003 | Pettey | |
| 2003/0046330 A1 | 3/2003 | Hayes | |
| 2003/0066011 A1 | 4/2003 | Oren | |
| 2003/0067903 A1 | 4/2003 | Jorgensen | |
| 2003/0110271 A1* | 6/2003 | Jayam et al. | 709/228 |
| 2003/0110344 A1 | 6/2003 | Szczepanek et al. | |
| 2003/0165160 A1 | 9/2003 | Minami et al. | |
| 2004/0010712 A1 | 1/2004 | Hui et al. | |
| 2004/0042458 A1 | 3/2004 | Elzu | |
| 2004/0042464 A1 | 3/2004 | Elzur et al. | |
| 2004/0049580 A1 | 3/2004 | Boyd et al. | |
| 2004/0049601 A1 | 3/2004 | Boyd et al. | |
| 2004/0054814 A1 | 3/2004 | McDaniel | |
| 2004/0059926 A1 | 3/2004 | Angelo et al. | |
| 2004/0073703 A1* | 4/2004 | Boucher et al. | 709/245 |
| 2004/0088262 A1 | 5/2004 | Boucher et al. | |
| 2004/0153578 A1 | 8/2004 | Elzur | |
| 2004/0210795 A1 | 10/2004 | Anderson | |
| 2004/0213290 A1 | 10/2004 | Johnson et al. | |
| 2004/0246974 A1 | 12/2004 | Gyugyi et al. | |
| 2004/0249957 A1 | 12/2004 | Ekis et al. | |
| 2004/0267866 A1* | 12/2004 | Carollo et al. | 709/200 |
| 2005/0060538 A1 | 3/2005 | Beverly | |
| 2005/0144300 A1 | 6/2005 | Craft et al. | |
| 2006/0133386 A1 | 6/2006 | McCormack et al. | |
| 2006/0248208 A1 | 11/2006 | Walbeck et al. | |
| 2006/0274762 A1* | 12/2006 | Pong | 370/400 |
| 2007/0083682 A1 | 4/2007 | Bartley et al. | |
| 2007/0140240 A1 | 6/2007 | Dally et al. | |
| 2008/0043732 A1 | 2/2008 | Desai et al. | |
| 2008/0170501 A1 | 7/2008 | Patel et al. | |
| 2008/0184273 A1* | 7/2008 | Sekar | 719/319 |
| 2008/0209084 A1 | 8/2008 | Wang et al. | |
| 2008/0240111 A1 | 10/2008 | Gadelrab | |
| 2009/0063696 A1 | 3/2009 | Wang et al. | |

FOREIGN PATENT DOCUMENTS

| | | |
|---|---|---|
| WO | WO 99/04343 | 1/1999 |
| WO | WO 99/65219 | 12/1999 |
| WO | WO 00-13091 | 3/2000 |
| WO | WO 01-04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |
| WO | WO 2007/130476 | 11/2007 |

OTHER PUBLICATIONS

"Z85C30 CMOS SCC Serial Communication Controller", Zilog Inc. Zilog product Brief. 1997. 3 pages.

"ISmart LAN Work Requests." Internet pages of Xpoint Technologies, Inc. printed Dec. 21, 1998. 13 pages.

"Asante and 100BASE-T Fast Ethernet." Internet pages printed May 27, 1997. 7 pages.

"A Guide to the Paragon XP/S-A7 Supercomputer at Indiana University." Internet pages printed Dec. 21, 1998. 13 pages.

Stevens, Richard. "TCP/IP Illustrated, vol. 1, The Protocols." 1994. pp. 325-326.

"Northridge/Southbridge vs. Intel Hub Architecture." Internet pages printed Feb. 19, 2001. 4 pages.

"Gigabit Ethernet Technical Brief, Achieving End-to-End Performance." Alteon Networks, Inc., First Edition. Sep. 1996. 15 pages.

"Technical Brief on Alteon Ethernet Gigabit NIC Technology." Internet pages downloaded from www.alteon.com. Printed Mar. 15, 1997. 14 pages.

"VT8501 Apollo MVP4." VIA Technologies, Inc. Revision 1.3. Feb. 1, 2000. pp. i-iv, 1-11, cover and copyright page.

"iReady Rounding Out Management Team with Two Key Executives." iReady News Archives article downloaded from http://www.ireadyco.com/archives/keyexec.html. Printed Nov. 28, 1998. 2 pages.

Internet pages from iReady Products, web sitehttp://www.ireadyco.com/products,html. Printed Nov. 25, 1998. 2 pages.

iReady News Archives, Toshiba, iReady shipping Internet chip. Printed Nov. 25, 1998. 1 page.

"Technology." Interprophet article downloaded fromhttp://www.interprophet.com/technology.html. Printed Mar. 1, 2000. 17 pages.

"The I-1000 Internet Tuner." iReady Corporation article. Date unknown. 2 pages.

"About Us Introduction." iReady article downloaded from the internet http://www.iReadyco.com/about.html. Pritned Nov. 25, 1998. 3 pages.

"Revolutionary Approach to Consumer Electronics Internet Connectivity Funded." iReady News Archive article. San Jose, California. Nov. 20,1997 (printed Nov. 2, 1998). 2 pages.

"Seiko Instruments Inc. (SII) Introduces World'S First Internet-Ready Intelligent LCD Modules Based on iReady Technology." iReady News Archive article. Santa Clara, CA and Chiba, Japan. Oct. 26, 1998 (printed Nov. 2, 1998. 2 pages.

"iReady internet Tuner to Web Enable Devices." NEWSwatch article. Tuesday, Nov. 5, 1996 (printed Nov. 2, 1998). 2 pages.

Lammers, David. "Tuner for Toshiba, Toshiba Taps iReady for Internet Tuner." EE Times article. Printed Nov. 2, 1998. 2 pages.

Carbone, J.S. "Comparison of Novell Netware and TCP/IP Protocol Architectures." Printed Apr. 10, 1998. 19 pages.

"AEA-7110C-a DuraSAN product." Adaptec article. Printed Oct. 1, 2001. 11 pages.

"iSCSI and 2Gigabit fibre Channel Host Bus Adapters from Emulex, QLogic, Adaptec, JNI." iSCSI HBA article. Printed Oct. 1, 2001. 8 pages.

"FCE-3210/6410 32 and 64-bit PCI-to-Fibre Channel HBA." iSCSI HBA article. Printed Oct. 1, 2001. 6 pages.

"iSCSI Storage." ISCSI.com article. Pritned Oct. 1, 2001. 2 pages.

Kalampoulkas et al. "Two-Way TCP Traffic Over Rate Controlled Channels: Effects and Analysis." IEEE Transactions on Networking. vol. 6, No. 6. Dec. 1998. 17 pages.

"Toshiba Delivers First Chips to Make Consumer Devices Internet-Ready Based on iReady Design." IReady News article. Santa Clara, CA, and Tokyo, Japan. Oct. 14, 1998 (printed Nov. 2, 1998). 3 pages.

Jolitz, Lynne. "Frequently Asked Questions." Internet pages of InterProphet. Printed Jun. 14, 1999. 4 pages.

Hitz et al. "File System Design for an NFS File Server Appliance." Winter of 1992. 13 pages.

"Adaptec Announces EtherStorage Technology." Adaptec Press Release article. May 4, 2000 (printed Jun. 15, 2000). 2 pages.

"EtherStorage Frequently Asked Questions." Adapted article. Printed Jul. 19, 2000. 5 pages.

"EtherStorage White Paper." Adapted article. Printed Jul. 19, 2000. 7 pages.

Berlino, J. et al. "Computers; Storage." CIBC World Markets article. Aug. 7, 2000. 9 pages.

Milunovich, S. Merrill Lynch article entitled "Storage Futures." Merrill Lynch article. May 10, 2000. 22 pages.

Taylor, S. "Montreal Start-Up Battles Data Storage Bottleneck." CBS Market Watch article. Mar. 5, 2000 (printed Mar. 7, 2000). 2 pages.

Satran, J. et al. "SCSI/TCP (SCSI over TCP)." Internet-draft article. Feb. 2000 (printed May 19, 2000). 38 pages.

"Technical White Paper-Xpoint's Disk to LAN Acceleration Solution for Windows NT Server." Internet pages. Printed Jun. 5, 1997. 15 pages.

"Network Accelerator Chip Architecture, twelve-slide presentation." Jato Technologies article. Printed Aug. 19, 1998. 13 pages.

"Enterprise System Uses Flexible Spec." EETimes article. Aug. 10,1998 (printed Nov. 25, 1998). 3 pages.

"Smart Ethernet Network Interface Cards," which Berend Ozceri is developing. Internet pages. Printed Nov. 25, 1998. 2 pages.

"GigaPower Protocol Processor Product Review." Internet pages of Xaqti corporation. Printed Nov. 25, 1999. 4 pages.

Oren, Amit (inventor). Assignee: Siliquent Technologies Ltd. "CRC Calculations for Out of Order PUDs." U.S. Appl. No. 60/283,896, filed Apr. 12, 2003.

Walsh, Robert J. "DART: Fast Application Level Networking via Data-Copy Avoidance." Internet pages. Printed Jun. 3, 1999. 25 pages.

Tanenbaum, Andrew S. Computer Networks, Third Edition, ISBN 0-13-349945-6. Mar. 6, 1996.

Druschel, Peter et al. "LRP: A New Network Subsystem Architecture for Server Systems." Article from Rice University. Oct. 1996. 14 pages.

"TCP Control Block Interdependence." Internet RFC/STD/FYI/BCP Archives article with heading "RFC2140" web address http://www.faqs.org/rfcs/rfc2140.html. Printed Sep. 2, 2002. 9 pages.

"Tornado: For Intelligent Network Acceleration." WindRiver article. Copyright Wind River Systems. 2001. 2 pages.

"Complete TCP/IP Offload for High-Speed Ethernet Networks." WindRiver White Paper. Copyright Wind River Systems. 2002. 7 pages.

"Solving Server Bottlenecks with Intel Server Adapters." Intel article. Copyright Intel Corporation. 1999. 8 pages.

Schwaderer et al. "XTP in VLSI Protocol Decomposition for ASIC Implementation." IEEE Computer Society Press publication from 15th Conference on Local Computer Networks. Sep. 30-Oct. 3, 1990. 5 pages.

Beach, Bob. "UltraNet: An Architecture for Gigabit Networking." IEEE Computer Society Press publication from 15th Conference on Local Computer Networks. Sep. 30-Oct. 3, 1990. 18 pages.

Chesson, et al. "The Protocol Engine Chipset." IEEE Symposium Record from Hot Chips III. Aug. 26-27, 1991. 16 pages.

MacLean et al. "An Outboard Processor for High Performance Implementation of Transport Layer Protocols." IEEE Global Telecommunications Conference, Globecom '91, presentation. Dec. 2-5, 1991. 7 pages.

Ross et al. "FX1000: A high performance single chip Gigabit Ethernet NIC." IEEE article from Compcon '97 Proceedings. Feb. 23-26, 1997. 7 pages.

Strayer et al. "Ch. 9: The Protocol Engine." From XTP: The Transfer Protocol. Jul. 1992. 12 pages.

Publication entitled "Protocol Engine Handbook." Oct. 1990. 44 pages.

Koufopavlou et al. "Parallel TCP for High Performance Communication Subsystems." IEEE Global Telecommunications Conference, Globecom '92, presentation. Dec. 6-9, 1992. 7 pages.

Lilienkamp et al. Proposed Host-Front End Protocol. Dec. 1984. 56 pages.

Thia et al. "High-Speed OSI Protocol Bypass Algorithm with Window Flow Control." Protocols for High Speed Networks. 1993. pp. 53-68.

Jolitz, William et al. "TCP/IP Network Accelerator and Method of Use." Filed Jul. 17, 1997. U.S. Appl. No. 60/053,240.

Thia et al. "A Reduced Operational Protocol Engine (ROPE) for a multiple-layer bypass architecture." Protocols for High Speed Networks. 1995. pp. 224-239.

Form 10-K for Exelan, Inc., for the fiscal year ending Dec. 31, 1987. 10 pages.

Form 10-K for Exelan, Inc., for the fiscal year ending Dec. 31, 1988. 10 pages.

Merritt, Rick. "Ethernet Interconnect Outpacing Infiniband at Intel." EE Times article. Sep. 11, 2002. 9 pages.

Starr, David D. et al. "Intelligent Network Storage Interface Device." Confirmation No. 9585; Filed Sep. 29, 2000.

Boucher, Laurence B. et al. "Intelligent Network Interface System and Method for Accelerated Protocol Processing." Confirmation No. 5890; Filed Oct. 18, 2000.

Craft, Peter K. et al. "Transferring Control of TCP Connections Between Hierarchy of Processing Mechanisms." . Confirmation No. 3046; Filed Oct. 11, 2005.

Starr, Daryl D. et al. "Accelerating Data Transfer in a Virtual Computer System with Tightly Coupled TCP Connections." Confirmation No. 3065; Filed Mar. 24, 2009.

Craft, Peter K. et al. "TCP Offload Send Optimization." Confirmation No. 9303; Filed Jul. 16, 2009.

Craft, Peter K. et al. "TCP Offload Device that Batches Session Layer Headers to Reduce Interrupts as Well as CPU Copies." Confirmation No. 2393; Filed Oct. 19, 2009.

Philbrick, Clive M. et al. "Freeing Transmit Memory on a Network Interface Device Prior to Receiving an Acknowledgment That Transmit Data Has Been Received by a Remote Device." Confirmation No. 4934; Filed May 22, 2009.

Boucher, Laurence B. et al. "Obtaining a Destination Address So That a Network Interface Device Can Write Network Data Without Headers Directly Into Host Memory." Confirmation No. 2493; Dec. 1, 2008.

Boucher, Laurence B. et al. "Enabling An Enhanced Function of an Electronic Device." Confirmation No. 9878; Filed Nov. 19, 2007.

Starr, Daryl D. et al. "Network Interface Devicd With 10 Gb/s Full-Duplex Transfer Rate." Confirmation No. 6200; Filed May 1, 2007.

Craft, Peter K. et al. "Peripheral Device That DMAS The Same Data to Different Locations in a Computer." Confirmation No. 5750; Filed Apr. 19, 2007.

Boucher, Laurence B. et al. "TCP/IP Offload Network Interface Device." Confirmation No. 7450; Filed Feb. 2, 2007.

Starr, Daryl D. et al. "TCP/IP Offload Device With Reduced Sequential Processing." Confirmation No. 8739; Filed Feb. 6, 2006.

Boucher, Laurence B. et al. "Network Interface Device That Can Transfer Control of a TCP Connection to a Host CPU." Confirmation No. 6345; Filed Jan. 4, 2005.

Craft, Peter K. et al. "Protocol Stack That Offloads a TCP Connection From a Host Computer to a Network Interface Device." Confirmation No. 6231; Filed Dec. 30, 2004.

Craft, Peter K. et al. "Protocol Stack That Offloads a TCP Connection From a Host Computer to a Network Interface Device." Confirmation No. 2157; Filed Dec. 16, 2004.

Boucher, Laurence B. et al. "Method and Apparatus for Dynamic Packet Batching With a High Performance Network Interface." Confirmation No. 9798; Filed Oct. 3, 2003.

Philbrick Clive M. et al. "Method and Apparatus for Data Re-Assembly With a High Performance Network Interface." Confirmation No. 5537; Filed Aug. 4, 2003.

Boucher, Laurence B. et al. "High Network Interface Device and System for Accelerated Communication." tConfirmation No. 9286; Filed Jun. 19, 2003.

Boucher, Laurence B. et al. "Method and Apparatus for Distributing Network Traffic Processing on a Multiprocessor Computer." Confirmation No. 7151; Filed may 14, 2003.

Boucher, Laurence B. et al. "Parsing a Packet Header." Confirmation No. 7644; Filed Oct. 18, 2002.

Starr, Daryl D.. et al. "Intelligient Network Storage Interface System." Confirmation No. 6753; Filed Sep. 30, 2002.

Chandranmenon, Girish P. et al. "Trading Packet Headers for Packet Processing." IEEE/ACM Transactions on Networking. vol. 4, No. 2. Apr. 1996. pp. 141-152.

* cited by examiner

ACCELERATING DATA TRANSFER IN A VIRTUAL COMPUTER SYSTEM WITH TIGHTLY COUPLED TCP CONNECTIONS

CROSS-REFERENCE TO RELATED APPLICATIONS

This application claims the benefit under 35 U.S.C. 119 of Provisional Patent Application Ser. No. 61/072,773, filed Apr. 1, 2008, by the same inventors and having the same title, which is incorporated by reference herein.

BACKGROUND

Virtual computer systems, in which more than one operating system runs on a computer system, have been known for decades. Variations of virtual computer systems include'architectures in which plural operating systems run on a single processor, plural operating systems run on plural processors, and plural operating systems run on plural processors that are connected by an input/output (I/O) bus such as a personal computer interconnect (PCI) bus.

Virtual computer systems include architectures in which one or more of the operating systems runs above a native operating system, and architectures in which plural operating systems run above a virtual machine monitor (VMM) or hypervisor layer. Such a VMM or hypervisor can provide a common platform for those operating systems that run above it, and a VMM or hypervisor layer may emulate hardware to the operating systems running above it.

As with other conventional computer systems, an operating system for a virtual computer system may contain a file system that organizes data stored on a disk or other storage system, and a network protocol stack for communicating, via a network interface device, with other entities over a network. When different operating systems of a virtual computer system wish to communicate with each other, for example to exchange data, they typically do so via networking protocols.

Certain networking protocols, such as Transmission Control Protocol (TCP), provide guaranteed delivery of data and other features that require significant computing resources to run. For example, TCP requires a complex control block, sometimes called a TCP control block or TCB, to be maintained at a network node such as a computer system for each logical connection that is set up to provide TCP services. Such a TCB contains status information that fully describes the logical connection from the standpoint of the node by which it is maintained, and so can also be called a TCP connection. An exemplary TCP control block is discussed and illustrated in chapter 24, pages 795-815 of "TCP/IP Illustrated, Volume 2," Wright and Stevens (1994), which is incorporated herein by reference. Due to the resources required to run TCP, some network interfaces, whether provided as add-on-cards or board-level products such as chipsets, have processors or other hardware that offload processing of TCP from a central processing unit (CPU) of the computer system.

When different operating systems of a virtual computer system exchange data using TCP, the resources required of the virtual computer system to exchange the data are typically doubled in comparison with a computer system that runs only one of the operating systems communicating over a network. For example, to send-data by TCP, a first operating system of the virtual computer system establishes a TCP connection with a second operating system of the VC system, after which the first application may request to send data to the second application. The data is then acquired by the network stack of the first operating system and split into TCP/IP segments which are prefixed with TCP/IP headers including checksums of both the data and the headers, each step of which can include copying the data by the CPU of the VC. Each of the packets containing headers and data is then prefixed with a data link layer header and transmitted on the network, only to be received from the network by the same VC system, which essentially reverses the process performed by the first operating system and first protocol stack, in order to receive the data by the second operating system and second protocol stack. That is, the second protocol stack analyzes the headers and checksums of each received data packet, and reassembles the data from the packets, and then provides the data to the second application, each step of which can again include copying the data by the CPU of the VC.

Because the data to be sent from a first application running on a first operating system of a VC to a second application running on a second operating system of the VC may be stored on a memory that can be accessed by both operating systems, proposals have been made to transfer data between guest operating systems by memory mapping procedures instead of using network protocols such as TCP. While such memory remapping could eliminate much of the double copying described above, the logistics are complex and perhaps for this reason are not commonly implemented.

SUMMARY

In one embodiment, first and second operating systems of a virtual computer system can communicate using respective first and second network protocol stacks, by employing procedures that are specialized for a situation in which a TCP control block of the first stack and a TCP control block of the second stack correspond to the same logical connection. In this case, various TCP requirements can be bypassed by coupling the TCP control blocks, reducing or eliminating data copies and providing other efficiencies. This brief summary does not purport to define the invention, which is described in detail below and defined by the claims.

DETAILED DESCRIPTION

Figure 1:
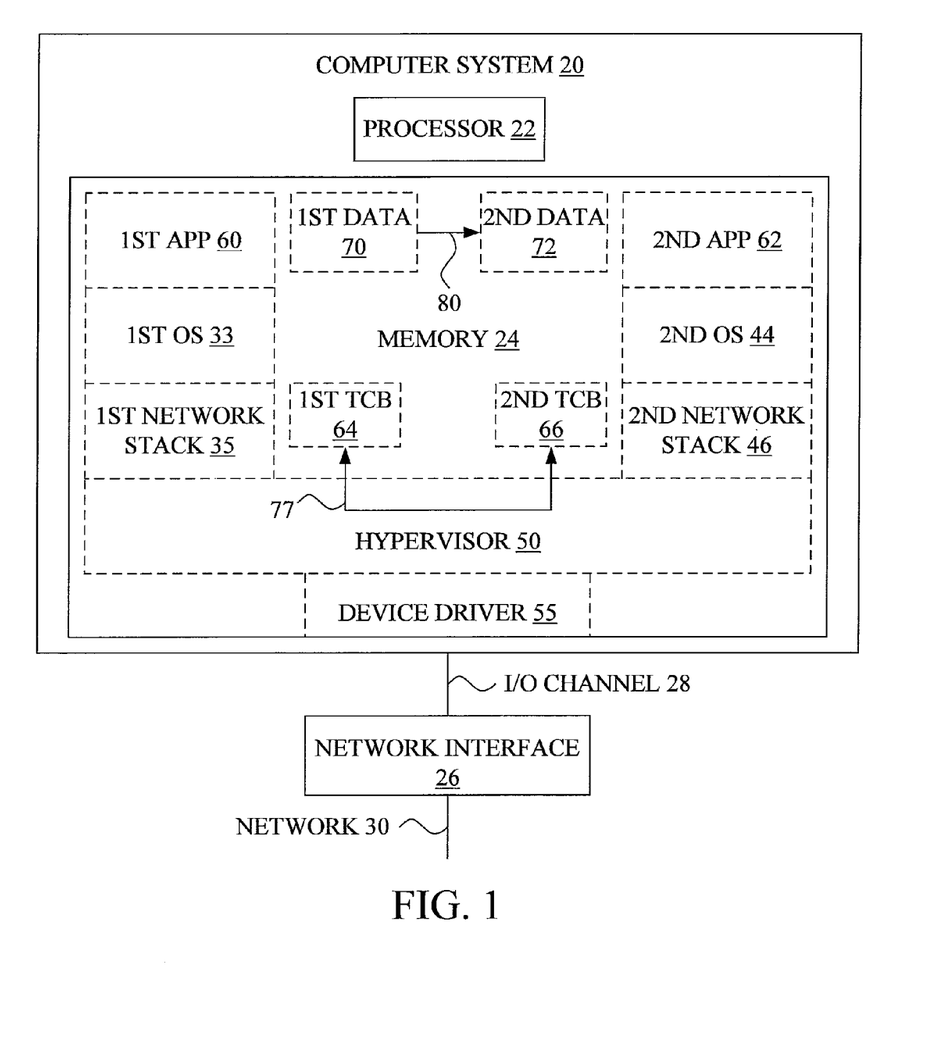
FIG. 1 shows a computer system having plural operating systems communicating with each other using tightly-coupled TCP and a hypervisor.

FIG. 1 shows a computer system 20 having a processor 22 and a memory 24. Although a single processor and memory are shown to facilitate understanding, plural processors and/or plural memories may be employed in place of those individual elements, in this figure as well as in subsequent figures. The computer system 20 is connected to a network interface 26 by an I/O channel 28 such as a PCI bus, and the network interface 26 is connected to a network 30.

The computer system 20 is running a first operating system 33 and a second operating system 44, and may be called a virtual computer system. The first operating system 33 and second operating system 44 both run on processor 22 with their instructions stored in memory 24 in this embodiment, although in other embodiments the operating systems may run on different processors and/or be stored on different memories. The first operating system 33 has a first network stack 35 that includes conventional components such as a first TCP layer and a first IP layer. The second operating system 44 has a second network stack 46 that includes conventional components such as a second TCP layer and a second IP layer.

The first operating system 33 and the second operating system 44 run over a VMM or hypervisor 50 that allows both operating systems to be part of the same computer system 20. Although hypervisor 50 is shown simply as a platform for the operating systems, it may also or instead be a native operating system above which the first operating system 33 and second operating system 44 both run. A device driver 55 allows the hypervisor 50 and operating systems 33 and 44 to interact with the network interface 26. Although the device driver 55 is shown as a layer of instructions below the hypervisor 50, individual device drivers may instead be provided for the first and second operating systems 33, or the device driver 55 may be incorporated in the hypervisor 50. Similarly, although the network interface 26 is shown as a separate entity in FIG. 1, it may be considered part of computers system 20, and may be connected to processor 22 and memory 24 by an internal computer bus rather than an I/O channel.

A first application 60 or other process is running above the first operating system 33, and a second application 62 or other process is running above the second operating system 44. In order to communicate between the first application 60 and the second application 62, the first operating system 33 may use the first network stack 35 and the second operating system 44 may use the second network stack 46. For example, a logical connection may be established between the first TCP layer, which is part of the first network stack 35, and the second TCP layer, which is part of the second network stack 46. To maintain that connection, the first TCP layer creates a first TCP control block or first TCB 64. Because first TCB 64 fully characterizes the state of the logical connection from the standpoint of the first operating system 33 and first network stack 35, it may also be called a TCP connection. Similarly, the second TCP layer creates a second TCP control block or second TCB 66, which fully characterizes the state of the logical connection from the standpoint of the second operating system 44 and second network stack 46, and may also be called a TCP connection.

The TCBs 64 and 66, like all TCP control blocks, can be identified by their source and destination IP addresses and by their source and destination TCP ports. Unlike most or all other TCP control blocks that may be contained in memory 24, however, TCBs 64 and 66 can be identified by each other. That is, because first TCB 64 and second TCB 66 represent two sides of the same logical connection, TCB 64 and TCB 66 are in many aspects mirror images of each other. For example, Table 1 and Table 2 below show that the identifying source and destination IP addresses and TCP ports (sometimes called a four-tuple) of first TCB 64 and second TCB 66 are mirror images of each other.

TABLE 1

| TCB 64 | |
|---|---|
| Source IP Address | A |
| Destination IP Address | B |
| Source TCP Port | X |
| Destination TCP Port | Y |

TABLE 2

| TCB 66 | |
|---|---|
| Source IP Address | B |
| Destination IP Address | A |
| Source TCP Port | Y |
| Destination TCP Port | X |

While the mirror image four-tuples of TCB 64 and TCB 66 allow the pair of TCBs to be identified as belonging to the same logical connection, other aspects of the reciprocal relationship between the first and second TCP connections can be exploited to violate some of the rules of TCP without sacrificing any TCP attributes, providing greatly accelerated data transfer with greatly reduced work by processor 22. That is, because the TCP state is located and referenced by the same set of instructions, conventional TCP processing can modified to reference and update both TCP control blocks essentially simultaneously. In doing so, traditional TCP processing changes radically. The transmit payload can be transferred directly to a receive buffer in the peer without first segmenting it into MSS-sized packets. Furthermore, the need for ACKs and window updates is eliminated—instead, fields like SndUna and SndWnd can be updated directly in the sender's TCB based on the state of the receiver. These types of modifications for "tightly coupled" TCP connections may also be employed for other network protocols used by guest operating systems of a virtual computer system.

Figure 2:
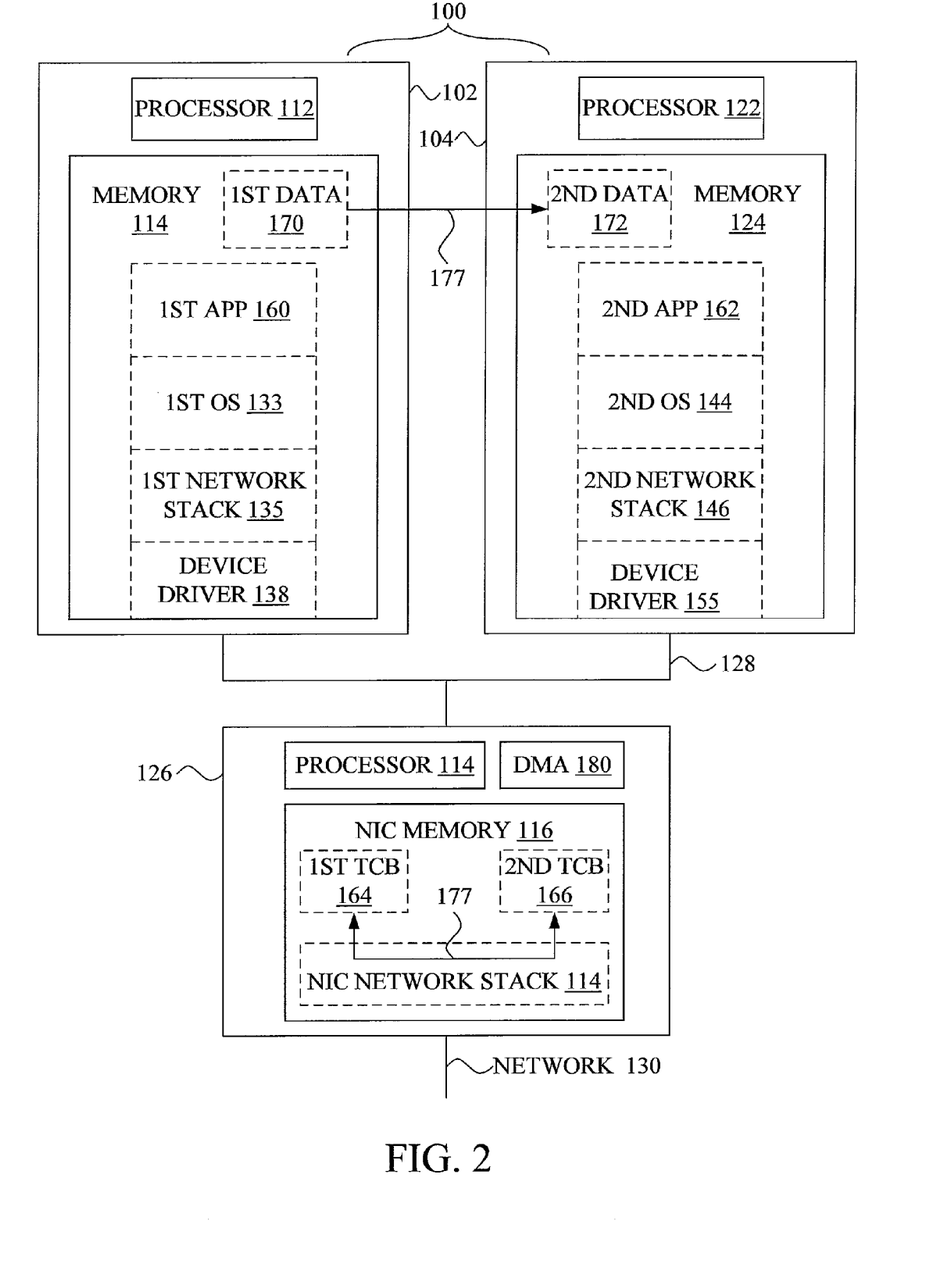
FIG. 2 shows a computer system having plural operating system communicating with each other using tightly-coupled TCP and a network interface card.

As described in more detail below, tightly coupled TCP communication may be implemented using a hypervisor or other common entity in a virtualized system, as shown by arrow 77, as well as with an offload device such as a transport offload engine (TOE) network interface card (NIC) or other device, an example of which is shown in FIG. 2. In any event, one area of interest is the recognition that two ends of a logical connection such as a TCP connection exist on the same computer system, so that the reciprocal TCBs can be coupled together and communication between the ends of the logical connection accelerated. Because the TCBs are owned by different operating systems, coupling them together first requires that the TCBs are both offloaded to an entity that can control them both, such as the hypervisor or offload device, and as a result can be tightly coupled. In this sense, offloading the TCBs merely means that they are controlled by a different process than the respective TCP layers that established them. Offloading may also mean that the TCBs have been copied to a different part of memory from that in which they were established, to facilitate their being referenced by the same logical code. There may be other reasons to offload one or both TCBs in addition to affording tight coupling, and so the condition in which one or both TCBs have been offloaded may exist before or after the identification of the TCBs as being reciprocal.

The identification of reciprocal TCBs may be performed in various ways and at different times. For example, the hypervisor 50 or device driver 55 can monitor connection establishment packets (SYNs) or other TCB related packets and provide a notification up to the network stacks 35 and 46 that they should offload the connections associated with the IP addresses and ports contained in the packets. Alternatively, at a time when one of the network stacks 35 or 46 offloads a connection to hypervisor 50, the hypervisor can check to determine whether it also controls the other end of that connection. It is also possible for the hypervisor 50 to check for reciprocal TCBs when a request for data transfer is sent by one of the applications or other processes to the other application or process. In either of the latter categories, the identification of TCB reciprocity can entail searching a list of offloaded connections to find two TCBs with matching IP addresses and TCP ports, so that the IP addresses and TCP ports are mirror images of each other. Such a search may be implemented as a linear search of all offloaded TCBs, or it may involve a hashing mechanism on some or all of the four-tuple to reduce the overhead of the search.

For a dynamic offload NIC, illustrated and discussed more fully below with, respect to FIG. 2, any of the above methods for identifying reciprocal TCBs may be employed. For a full offload NIC, in which TCP connections are established and maintained on the NIC rather than dynamically offloaded to the NIC, also discussed more fully below, the possibility of identifying TCB reciprocity during the offloading of a TCP connection to the NIC is not present.

Once a pair of TCBs has been identified as reciprocal, those TCBs may be flagged as tightly coupled and linked together via a pointer, for example. To link the TCBs together by a pointer, for example, first TCB 64 can point to the location in memory of second TCB 66, and visa versa. Should these connections be flagged as tightly coupled and/or linked together in this fashion, corresponding code is run by the hypervisor 50 or other entity that accesses both TCBs to remove this flag and/or break the link when one or both of these connections is "uploaded" from the hypervisor or offload device. In this sense, uploading the TCBs means that their control is returned to the respective TCP layers that established them. Such an uploaded TCB may be flagged as having been previously tightly coupled, with an indication to look for the reciprocal TCB to facilitate tight coupling in the future, should it be offloaded again. In some cases it may be desirable to send a request from the hypervisor 50 to a network stack to offload a TCB that is reciprocal to one already controlled by the hypervisor, especially if the TCB controlled by the hypervisor is flagged as having been previously tightly coupled.

Synergistic advantages of tightly coupled TCP can be realized when one or the other sides of a tightly coupled logical connection performs an I/O operation such as data transfer from one side to the other. This is shown symbolically in FIG. 1 as transfer 80 of first data 70, which is under control of first application 60, to second data 72, which is under control of second application 62. As described in the previous section, a first step in this operation is the recognition that both ends of the connection are found in the same system, either by packet monitoring, four-tuple lookup or via flags or other identification mechanisms. Tightly coupled I/O involves essentially simultaneously sending from one side while receiving on the other. This can occur, for example, when a single function call is applied to both sides. For example, a function call might be written to perform portions of both the FreeBSD tcp_input and tcp_output operations on both TCBs simultaneously. It is still useful, however, to discuss the procedures from the viewpoint of both the sending and receiving sides of the connection, even though sending and receiving may not happen in a traditional sense.

The receiving side of tightly coupled TCP may involve different modes of operation. For instance, a receiving application may have "posted" one or more buffers to the operating system in which it would like received data to be placed. That buffer can then propagated to the underlying hypervisor or offload device that will manage the tightly coupled connection. We call this the "posted buffer" mode. Conversely, if no receive buffer has been posted, received data might be "indicated" from the underlying hypervisor or offload device, up to the guest operating system, and in turn to the application. We call this the "indication" mode.

In the "posted buffer" mode, the hypervisor or offload device may have access to the memory containing the data to be sent and the buffer in which to place it. Data transfer then involves a copy or DMA from the first location to the second with a length being the minimum of those two buffers. A DMA engine may be part of a chipset for processor 22, so that DMA transfer can occur without data crossing the I/O channel 28. Upon completion of that copy or DMA the state within both TCBs is updated to reflect this data transfer. For instance, on the sender, TCB fields such as SndNxt, SndMax and SndUna are all advanced by the length of data transferred. Note that by advancing SndUna we consider the data to be instantly acknowledged, although no acknowledgement packets are sent or received. Similarly, the TCB of the receiver is modified to advance RcvNxt by the same value. In this "posted buffer" mode, the state of each TCB is adjusted to reflect the fact that the window does not close as a result of this data transfer. This is due to the fact that the posted receive buffer is from the receiving application, and as such, the data is considered to be consumed by the application.

In the "indication" mode, the data is placed into network buffers controlled by the receiver. These buffers are typically allocated by a network device driver and then propagated up to the protocol stack or application, at which point the data contained in them is either "consumed" by copying the data (with the CPU) to another buffer, or "refused" (not consumed). In the event that data is not consumed, a "posted buffer" may be passed down instead.

There are several things to note about data transfer in "indication" mode. First, like the "posted buffer" mode, the state variables, including SndUna and RcvNxt are advanced by the amount of data transferred, and reflect the same "instant acknowledgment" as described above. One difference, however, is that in this case the data is not considered to be consumed by the application, and as such, the state variables are adjusted to reflect a closing receive window on the receiver. That window is opened via a subsequent notification to the hypervisor or offload device that data had been copied out of the network buffers into an application buffer. A second thing to note about "indication" mode is that it may be desirable to withhold some of the send data with the expectation that a "posted buffer" may be presented in response to the indicated data. Note further that in indication mode the possibility exists that receiver may be out of network receive buffers at the time that the sender wishes to send data. In this case, the hypervisor or offload engine may simply choose to delay the send until such a time as network buffers become available. The underlying hypervisor or offload engine would then be responsible for keeping track of which send operations are pending such that when network buffers are subsequently provided by the receiver, the pending send operations are then restarted.

The "posted buffer" mode is preferential to the "indication" mode in that data is moved directly to the application buffer and avoids a copy from the intermediate network buffer. As such, if there is a likelihood that a buffer will be posted, it is preferable to wait for that to occur.

It is worth noting that no packets of any kind need be sent or received for either TCP connection once the reciprocal TCBs are tightly coupled, in contrast to the double copying of each packet that may occur for communication between guest operating systems of a virtual computer system. A DMA operation, whether performed by a DMA engine on network interface 26 or computer system 20, can eliminate even the reduced copying between buffers that may otherwise be performed by a CPU such as processor 22. Other aspects of TCP are also altered or eliminated through the use of "tightly-coupled" TCP. Retransmission timers (and retransmits), window probes and keepalives are eliminated. Round trip timers are set to a fixed minimum and held there (no calculations performed). Slow-start, congestion-control, and error recovery mechanisms (new reno, sack) are bypassed entirely.

It should be noted, however, that while we are altering TCP behavior as it applies to communication within these two tightly coupled TCB's, the state of each TCB is maintained such that conventional TCP processing may resume at any time—which would be required should one or both TCB's be uploaded by its respective guest operating system.

Tightly coupled TCP operations may also include a TCP state change. For instance, one side of the connection might elect to close (disconnect) the connection. Like the data transfer discussion, this can involve simultaneously adjusting the state variables to reflect the transfer of a single byte (a FIN takes one sequence number). It also involves a state change on both halves of the connection. The state of the side that sent the FIN is changed to FIN_WAIT_2, while the state of the receiver is immediately changed to CLOSE_WAIT. Note that the state of the sender skips over FIN_WAIT_1 since the FIN is considered to be ACKed immediately.

This operation also requires an indication of the FIN, or an analogous disconnection notification, on the receiving side up to the protocol stack of the guest operating system. This indication may ultimately result in a close request in response, or possibly an upload of the connection. In the case of the close request, this would result in a similar state change operation, except that this time the sender of the FIN would move immediately from CLOSE_WAIT to CLOSED, skipping the LAST_ACK state due to the "immediate acknowledgement", while the receiver of the FIN would move from FIN_WAIT_2 to TIME_WAIT.

FIG. 2 shows a computer system 100 having a first computer 102 and a second computer 104 that are connected to a network interface 126 by, an I/O channel 128 such as a PCI bus, with the network interface 126 connected to a network 130. The first computer 102 has a first processor 112 and a first memory 114. The first computer 102 is running a first operating system 133 with a first network stack 135 that includes conventional components such as a first TCP layer and a first IP layer. A first device driver 138 is running below the first network stack 135 and a first application or other process 160 is running above the first operating system 133.

The second computer 104 has a second processor 122 and a second memory 124. The second computer 104 is running a second operating system 144 with a second network stack 146 that includes conventional components such as a second TCP layer and a second IP layer. A second device driver 155 is running below the second network stack 146 and a second application or other process 162 is running above the second operating system 144.

The NIC 126 includes a NIC processor 114 and a NIC memory 116, as well as a DMA engine 180 that can access computer memories 114 and 124. The NIC 126 includes a network protocol stack 114 or hardware that can perform network protocol functions, including at least a subset of TCP functions. The NIC 126 may be a dynamic offload NIC such as that pioneered by Alacritech, Inc., which can manage a TCP connection that has been established by first network stack 135 or second network stack 146, as described for example in U.S. Pat. No. 6,434,620, which is incorporated by reference. The NIC 126 may alternatively be a full offload NIC that establishes and maintains TCP connections but is not designed to transfer TCP connections from or to a computer or other device.

The NIC memory 116 contains a first TCB 164 that was established by the first network stack 135 and then acquired by the NIC 126. The NIC memory 116 may also contain many other TCBs, including a second TCB 166 that was established by the second network stack 144 and then acquired by the NIC 126. The first and second TCBs 164 and 166 both correspond to a logical connection between the first application 160 on the first computer 102 and the second application 162 on the second computer 104. TCB 164 and TCB 166 have been identified by the NIC 126 as being reciprocal, either by checking the four-tuples of packets, or TCBs, during connection establishment, TCB offload, or during data transfer, optionally using a hashing mechanism and/or NIC hardware to accelerate the search for reciprocal TCBs.

Once TCB 164 and TCB 166 have been identified by the NIC 126 as being reciprocal, they are coupled together as shown by arrow 177. The coupling 177 may include flagging the TCBs 164 and 166 as tightly coupled and/or linking them together via a pointer, for example. That is, first TCB 164 can point to the location in memory 116 of second TCB 166, and visa versa. Should these TCP connections be flagged as tightly coupled and/or linked together in this fashion, corresponding code is run by the NIC 126 to remove this flag and/or break the link when one or both of these connections is "uploaded" from the NIC 126 to respective computers 102 and/or 104. Such an uploaded TCB may be flagged as having been previously tightly coupled, with an indication to look for the reciprocal TCB to facilitate tight coupling in the future, should it be offloaded again.

The tightly coupled TCBs 164 and 166 can both be referenced within a single function call, providing substantially simultaneous updating of the TCBs. As mentioned above with regard to the hypervisor embodiment, many advantages of tightly coupled TCP can be realized when one of the sides of a tightly coupled logical connection performs an I/O operation such as data transfer from one side to the other. This is shown symbolically in FIG. 2 as transfer 177 of first data 170, which is under control of first application 160, to second data 172, which is under control of second application 162. Although labeled as first data 170 and second data 172 to facilitate understanding, first data may simply be a copy of second data, or vice-versa. Also, the transfer may actually take place via NIC 126, as described below, but from the viewpoint of computers 102 and 104 the effect may be that shown by arrow 177, because all of the data transfer processing can be offloaded to NIC 126 using tightly coupled TCP. The transfer of first data 170 to second data 172, after first TCB 164 and second TCB 166 have been tightly coupled, begins with a request or command to transfer data being communicated from one of the applications 160 or 172 to its respective operating system 133 or 144. The operating system 133 or 144 recognizes that the corresponding TCB 164 or 166 has been offloaded to NIC 126, and so sends a command to the NIC 126 to send the data.

The NIC 126 in turn recognizes that the corresponding TCB 164 or 166 has been flagged as part of a tightly coupled pair of TCBs, and that data transfer can therefore be accelerated. Instead of transferring the data by way of conventional TCP/IP packets, the data may be transferred by tightly coupled TCP using the posted buffer or indication modes described above. In either of these examples, the DMA engine may transfer multi-kilobyte (e.g., 64 KB) blocks of data between memory 114 and memory 124 without processor 112 or processor 122 performing any data copying. The DMA engine 180 performs such data transfers under control of processor 114, which executes specialized instructions for data transfer using tightly coupled TCP. In concert with the specialized instructions for data transfer, the processor executes instructions specialized for tightly coupled TCP to update TCBs 164 and 166. The specialized instructions for updating TCBs 164 and 166 may violate many rules of the TCB protocol, yet provide reliable, error free, ordered delivery of data without congestion, overflow or underflow. Portions of the TCP protocol that are modified or eliminated for data transfer with tightly coupled TCP include segmentation and reassembly, reordering of packets, window control, congestion control, creating and analyzing checksums, and acknowledgement processing. In short, tightly coupled TCP may accelerate data delivery by orders of magnitude while reducing total processing overhead by similar amounts, all without sacrificing any of the other attributes of TCP, such as guaranteed data delivery. Moreover, as noted above, conventional TCP processing can be resumed at any time.

Figure 3:
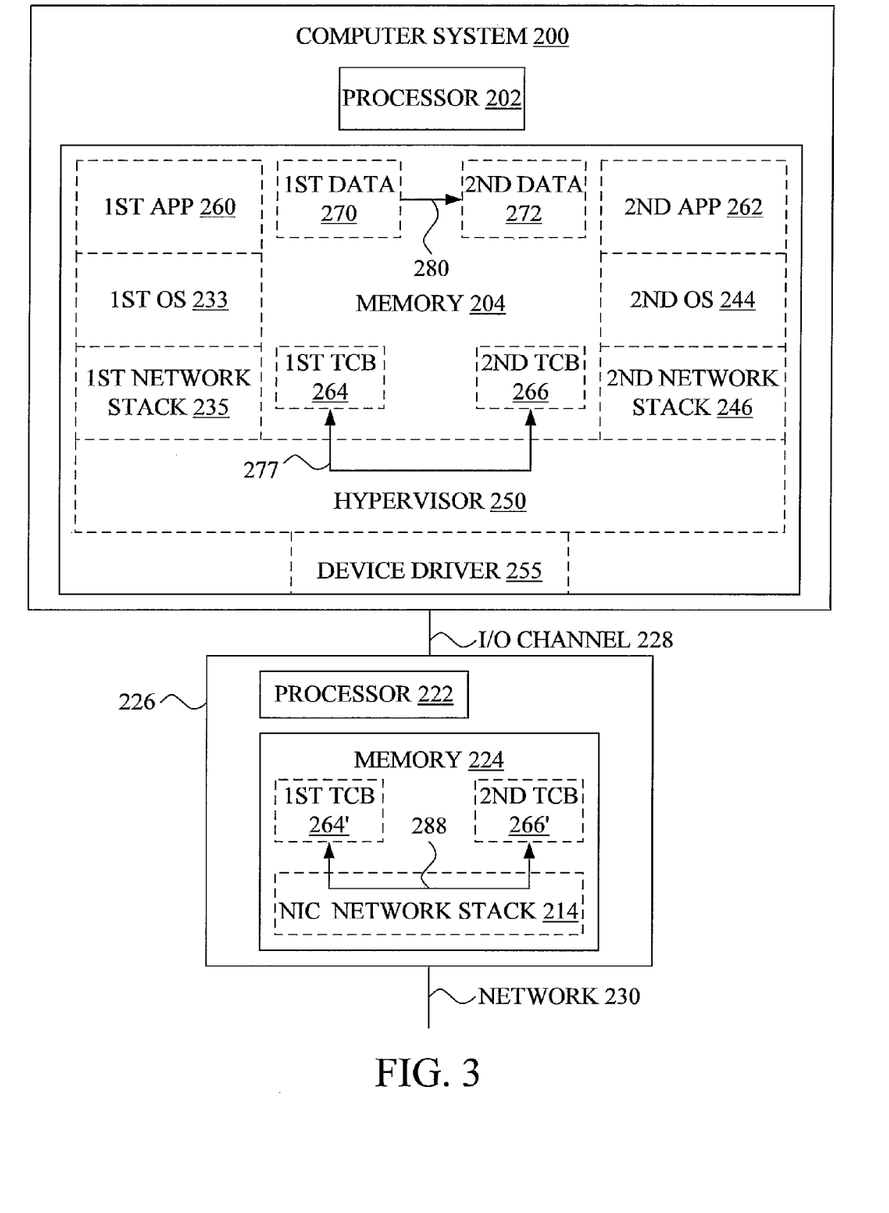
FIG. 3 shows a computer, system having plural operating system communicating with each other using tightly-coupled TCP that is transferred between a hypervisor and a network interface card.

FIG. 3 shows a computer system 200 having a processor 202 and a memory 204, the computer system connected to a network interface 226 by an I/O channel 228 (e.g., PCI, PCI Express, InfiniBand, etc.) with the network interface connected to a network 230. The computer system 200 is running a first operating system 233 and a second operating system 244, the first operating system 233 having a first network stack 235 that includes conventional components such as a first TCP layer and a first IP layer, the second operating system having a second network stack 246 that includes conventional components such as a second TCP layer and a second IP layer. A first application or other process 260 is running above the first operating system 233 and a second application or other process 262 is running above the second operating system 246. A hypervisor 250 is running below the first network stack 235 and second network stack 46, and a device driver 255 is running below or integrated into the hypervisor 250.

NIC 226 includes a NIC processor 222 and NIC memory 224, as well as a DMA engine 280 that can access computer memory 204, for example to transfer a TCB to or from NIC memory 224. The NIC 226 includes a network protocol stack 214 or hardware that can perform network protocol functions, including at least a subset of the TCP protocol, such as handling bulk data transfer for a TCP connection.

The first application 260 and second application 262 wish to communicate with each other and, because they are running above different operating systems of virtual computer system 200, utilize their respective network stacks to facilitate the communication. First network stack 235 establishes a first TCB 264 to define and manage that communication for the first application 260, and second network stack 246 establishes a second TCB 266 to define and manage that communication for the second application 262. Although the TCP protocol and TCP control blocks are discussed in this embodiment, other networking protocols that utilize control blocks to define and manage communications for applications may alternatively be employed. After establishment by the respective network stacks, TCB 264 and TCB 266 are offloaded to hypervisor 250, device driver 255 or another common platform or process for first and second operating systems 233 and 244. TCB 264 and TCB 266 may be identified by hypervisor 250, device driver 255 or another process or entity as being reciprocal, either by checking the four-tuples of packets or TCBs, during connection establishment, TCB offload, or during data transfer, optionally using a hashing mechanism and/or NIC 226 or other hardware to accelerate the search for reciprocal TCBs.

Once the reciprocal relationship of TCBS 264 and 266 has been identified, they can be tightly coupled, as illustrated by arrow 277, by hypervisor 250 or another entity having instructions that can reference TCB 264 and TCB 266 as a related pair of TCBs rather than with conventional instructions for individual TCBs that incorporate no knowledge of the reciprocal relationship between the TCBs. As described above, reciprocal TCBs 264 and 266 may be flagged as tightly coupled and linked together via a pointer, so that first TCB 264 can point to the location in memory of second TCB 266, and visa versa.

With TCBs 264 and 266 flagged as tightly coupled and/or linked together in this fashion, code may be run by the hypervisor 250 or other entity that accesses both TCBs to remove this flag and/or break the link when one or both of these connections is uploaded from the hypervisor or other entity, so that their control is returned to the respective TCP layers that established them. In this sense, uploading the TCBs means that their control is returned to the respective TCP layers that established them. Such an uploaded TCB may be flagged as having been previously tightly coupled, with an indication to look for the reciprocal TCB to facilitate tight coupling in the future, should it be offloaded again. In some cases it may be desirable to send a request from the hypervisor 250 or other entity that can perform tight coupling to a network stack to offload a TCB that is reciprocal to one already controlled by the hypervisor, especially if the TCB controlled by the hypervisor is flagged as having been previously tightly coupled.

Similar code can be provided should one or both of these TCBs be offloaded again, for example from hypervisor 250 to dynamic offload NIC 226. In this case, it may be desirable to offload the TCBs 264 and 266 together from the hypervisor to the NIC, so that the TCBs remain tightly coupled even during the offloading. Reasons for offloading a tightly coupled pair of connections from hypervisor 250 to NIC 226 include utilizing the hardware of NIC 226 rather than processor 202 to transfer data. A set of instructions that accomplishes this tightly coupled offloading may be provided to the hypervisor and the NIC, and a similar but converse set of instructions can be provided to those entities to accomplish a tightly coupled uploading. Because both ends of the logical connection are controlled by one entity, the possibility of in-transit packets that may cause a race condition in offloading a single TCB can be avoided, and a multistep offload need not occur.

FIG. 3 shows a situation in which tightly coupled TCBs 264 and 266 have been offloaded from hypervisor 250 to NIC 226 as a tightly coupled pair, and are maintained in NIC memory 224 as first TCB 264' and second TCB 266', which are tightly coupled as shown by arrow 288. Alternatively, first and second TCBs 264' and 266' may have been separately acquired by the NIC 226. First and second TCBs 264' and 266' may similarly be uploaded to hypervisor 250 as a tightly coupled pair or separately as individual TCBs. Uploading of the TCBs as a tightly-coupled pair may be accomplished in a single step, whereas separate uploading of the TCBs may require a three step process for each of the individual TCBs, to avoid the race condition mentioned above. In the former case the TCBs are flagged as being tightly-coupled and are acted on by instructions specialized for their tightly-coupled status, in the latter case each TCB is flagged as having been previously tightly coupled and is operated on by instructions for handling individual TCBs.

Although we have focused on detailed descriptions of particular embodiments, other embodiments and modifications are within the spirit of this invention as defined by the appended claims. For example, although TCP is discussed as an exemplary transport level protocol, other control blocks that define logical connections, which may be found in other protocols or in modifications to the TCP protocol, may instead be employed. Moreover, although a virtual computer system is discussed, other systems in which a single entity can access both ends of a logical connection may also be tightly-coupled.

The invention claimed is:

1. A device comprising:
a first operating system running on a computer system, the first operating system having a first network protocol stack including a first transmission control protocol (TCP) layer;
a second operating system running on the computer system, the second operating system having a second network protocol stack including a second TCP layer;
a logical connection established between the first and second TCP layers, the logical connection represented by the first TCP layer as a first TCP control block, the logical connection represented by the second TCP layer as a second TCP control block;
wherein the first TCP control block is coupled to the second TCP control block by a processor that accesses the first and second TCP control blocks and runs instructions that are specialized for a situation in which the first and second TCP control blocks correspond to the same logical connection.

2. The method of claim 1, wherein executing instructions includes referencing the first TCP control block and the second TCP control block within a function call.

3. The device of claim 1, wherein the processor is a part of an interface that is connected to the computer system by an input/output (I/0) channel.

4. The device of claim 1, wherein the instructions are a part of a virtual machine manager.

5. The device of claim 1, wherein the instructions are a part of the first operating system.

6. The device of claim 1, further comprising an instruction, stored on a computer readable medium, to check whether the first TCP control block and the second TCP control block correspond to the same logical connection.

7. The device of claim 1, further comprising an instruction, stored on a computer readable medium, to check whether the first TCP control block and the second TCP control block are reciprocal to each other.

8. The device of claim 1, further comprising an instruction, stored on a computer readable medium, to check whether the first TCP control block is identified by IP addresses and TCP ports that are a mirror image of the IP addresses and TCP ports of the second TCP control block.

9. The device of claim 1, further comprising an instruction, stored on a computer readable medium, to flag the first TCP control block and the second TCP control block as tightly-coupled.

10. The device of claim 1, wherein the first TCP control block points to a location in memory of the second TCP control block, and the second TCP control block points to a location in memory of the first TCP control block.

11. The device of claim 1, wherein the instructions include an instruction, stored on a computer readable medium, to transfer data without a corresponding TCP header from a memory source controlled by a process running above the first TCP layer directly to a memory destination controlled by a process running above the second TCP layer.

12. The device of claim 1, wherein the instructions include an instruction, stored on a computer readable medium, to transfer data by direct memory access (DMA) from a memory source controlled by a process running above the first TCP layer to a memory destination controlled by a process running above the second TCP layer.

13. The device of claim 1, wherein the instructions include an instruction, stored on a computer readable medium, to transfer data without transferring window update packets between the first and second TCP layers.

14. The device of claim 1, wherein the instructions include an instruction, stored on a computer readable medium, to transfer data without transferring acknowledgements (ACKs) between the first and second TCP layers.

15. The device of claim 1, wherein the instructions include an instruction, stored on a computer readable medium, to transfer data without segmenting data that is transferred between the first and second TCP layers.

16. The device of claim 1, wherein the instructions include an instruction, stored on a computer readable medium, to transfer data without checksumming data that is transferred between the first and second TCP layers.

17. The device of claim 1, wherein the instructions include an instruction, stored on a computer readable medium, to substantially simultaneously reference the first and second TCP control blocks by the processor.

18. The device of claim 1, wherein the instructions include an instruction, stored on a computer readable medium, to substantially simultaneously update the first and second TCP control blocks by the processor.

19. The device of claim 1, wherein:
the first operating system runs on a first central processing unit (CPU);
the second operating system runs on a second CPU that is connected to the first CPU by an I/0 channel.

20. A device comprising:
a first operating system running on a computer system, the first operating system having a first network protocol stack including a first transmission control protocol (TCP) layer;
a second operating system running on the computer system, the second operating system having a second network protocol stack including a second TCP layer;
a logical connection established between the first and second TCP layers, the logical connection represented by the first TCP layer as a first TCP control block, the logical connection represented by the second TCP layer as a second TCP control block; and
a processor executing a function call that references the first and second TCP control blocks.

21. The device of claim 20, wherein:
the first operating system runs on a first central processing unit (CPU); and
the second operating system runs on a second CPU that is connected to the first CPU by an 1/0 channel.

22. The device of claim 20, wherein the processor is a part of an interface that is connected to the computer system by an input/output (1/0) channel.

23. The device of claim 20, wherein the instructions are a part of a virtual machine manager.

24. The device of claim 20, wherein the instructions are a part of the first operating system.

25. The device of claim 20, further comprising an instruction, stored on a computer readable medium, to check whether the first TCP control block and the second TCP control block correspond to the same logical connection.

26. The device of claim 20, further comprising an instruction, stored on a computer readable medium, to check whether the first TCP control block and the second TCP control block are reciprocal to each other.

27. The device of claim 20, further comprising an instruction, stored on a computer readable medium, to check whether the first TCP control block is identified by IP addresses and TCP ports that are a mirror image of the IP addresses and TCP ports of the second TCP control block.

28. The device of claim 20, further comprising an instruction, stored on a computer readable medium, to flag the first TCP control block and the second TCP control block as tightly-coupled.

29. The device of claim 20, wherein the first TCP control block points to a location in memory of the second TCP control block, and the second TCP control block points to a location in memory of the first TCP control block.

30. The device of claim 20, wherein the function call includes an instruction, stored on a computer readable medium, to transfer data without a corresponding TCP header from a memory source controlled by a process running above the first TCP layer directly to a memory destination controlled by a process running above the second TCP layer.

31. The device of claim 20, wherein the function call includes an instruction, stored on a computer readable medium, to transfer data by direct memory access (DMA) from a memory source controlled by a process running above the first TCP layer to a memory destination controlled by a process running above the second TCP layer.

32. The device of claim 20, wherein the function call includes an instruction, stored on a computer readable medium, to transfer data without transferring window update packets between the first and second TCP layers.

33. The device of claim 20, wherein the function call includes an instruction, stored on a computer readable medium, to transfer data without transferring acknowledgements (ACKs) between the first and second TCP layers.

34. The device of claim 20, wherein the function call includes an instruction, stored on a computer readable medium, to transfer data without segmenting the data that is transferred between the first and second TCP layers.

35. The device of claim 20, wherein the function call includes an instruction, stored on a computer readable medium, to transfer data without checksumming the data that is transferred between the first and second TCP layers.

36. The device of claim 20, wherein the function call includes an instruction, stored on a computer readable medium, to substantially simultaneously reference the first and second TCP control blocks by the processor.

37. The device of claim 20, wherein the function call includes an instruction, stored on a computer readable medium, to substantially simultaneously update the first and second TCP control blocks by the processor.

38. A device comprising:
a computer readable memory;
a first control block (CB) stored in the memory and identified by a first CB source IP address, a first CB destination IP address, a first CB source TCP port and a first CB destination TCP port;
a second CB stored in the memory and identified by a second CB source IP address, a second CB destination IP address, a second CB source TCP port and a second CB destination TCP port, wherein the second CB source IP address is the first CB destination IP address, the second CB destination IP address is the first CB source IP address, the second CB source TCP port is the first CB destination TCP port, and the second CB destination TCP port is the first CB source TCP port; and
a function call stored in the memory and referencing the first CB and the second CB.

* * * * *